United States Patent [19]

Abe

[11] Patent Number: 4,911,602

[45] Date of Patent: Mar. 27, 1990

[54] CONTAINER SUPPLY SYSTEM

[75] Inventor: Ichiro Abe, Tokyo, Japan

[73] Assignee: Kirin Beer Kabushiki Kaisha, Tokyo, Japan

[21] Appl. No.: 367,463

[22] Filed: Jun. 16, 1989

[30] Foreign Application Priority Data

Jun. 17, 1988 [JP] Japan ................................ 63-151036

[51] Int. Cl.⁴ ....................... B65G 65/00; B65G 67/00; B65G 69/00

[52] U.S. Cl. .................................... 414/421; 134/134; 53/152; 53/258; 198/409; 414/417

[58] Field of Search ............... 414/414, 417, 419, 420, 414/421, 403; 134/133, 134; 198/403, 408, 409; 53/152, 258, 247

[56] References Cited

U.S. PATENT DOCUMENTS

| | | | |
|---|---|---|---|
| 1,700,944 | 2/1929 | Loew | 414/421 X |
| 2,541,809 | 2/1951 | Clark | 414/421 |
| 3,456,811 | 7/1969 | Mahoney et al. | 414/417 X |

FOREIGN PATENT DOCUMENTS

| | | | |
|---|---|---|---|
| 659226 | 5/1949 | United Kingdom | 414/417 |

*Primary Examiner*—Frank E. Werner
*Assistant Examiner*—Keith L. Dixon
*Attorney, Agent, or Firm*—Ladas & Parry

[57] ABSTRACT

A container supply system supplies a plurality of containers such bottles encased in a box to a container processing machine such as a bottle washing machine. The container supply system includes a box reverser for reversing the box with the bottles encased therein, a container holder disposed for holding the bottles discharged from the reversed box and thereafter releasing the bottles, a container receiver having a plurality of container receiver members for receiving the bottles, respectively, and a container ejector having a plurality of container ejector members for pushing the bottles from the container receiver to the container processing machine. In one embodiment, the container receiver is positioned below the box reverser. In another embodiment, the box reverser and the container receiver are spaced from each other, and a delivery carriage is provided for receiving the containers from the box reverser and delivering the received containers to the container receiver. Since the containers are directly supplied to the container processing machine by reversing the box which encases the containers, the containers can be smoothly and reliably delivered without the danger of falling over which would otherwise be encountered if the containers were individually supplied by a container conveyor.

7 Claims, 13 Drawing Sheets

CONTAINER SUPPLY SYSTEM

BACKGROUND OF THE INVENTION

The present invention relates to a container supply system, and more particularly to a container supply system for supplying containers such as bottles directly from a box to carriers in a container processing machine by reversing the box while the containers are being encased in the box, rather than taking the containers out of the box and individually delivering the containers.

Bottles for beverages such as beer bottles are usually recovered for reuse. Bottles are recovered from the market as being stored in boxes of synthetic resin. New bottles are also stored in boxes and delivered from bottle manufacturing factories. Both recovered and new bottles are washed by bottle washing machines, and then filled with desired beverages.

For supplying bottles to, for example, a bottle washing machine, it has been customary to take bottles out of a box with an uncaser, place the individual bottles on a feed conveyor and feed them erected to a supply unit in the bottle washing machine, move the bottles slidingly on an arcuate guide to turn them from the erected condition to a substantially horizontal posture, and then successively feed the bottles synchronously to a plurality of carriers that are interconnected by a chain or the like in the bottle washing machine.

One conventional process of supplying recovered bottles from a container supply system to a bottle washing machine will be described below with reference to FIGS. 20 and 21 of the accompany drawings Recovered bottles are stored in a box, which is delivered to an uncaser 152 by means of a case conveyor 151 as shown in FIG. 20. The bottles are taken out of the box by the uncaser 152, and individually put erected on a bottle conveyor 153 which feeds the bottles to a container supply apparatus 155.

As shown in FIG. 21, the container supply apparatus 155 comprises a bottle conveyor 156 for delivering the bottles, an arcuate guide 157, and a rotary arm 158. The bottles fed in arrays by the bottle conveyor 156 are turned down into a substantially horizontal position by the rotary arm 158 and the arcuate guide 157, and then supplied into a bottle washing machine 60.

The bottle washing machine 60 has a movable endless chain 61 holding a number of bottle carriers 62. The bottles supplied horizontally into the bottle washing machine 60 are successively put synchronously into the respective bottle carriers 62.

In the conventional bottle supply system, bottles are taken out of a box by the uncaser 152 and individually placed on and fed by the bottle conveyor 153. Since the bottles are relatively tall as compared with their bottom area, the center of gravity of the bottles is in a high position. As the erected bottles cannot be moved stably in mutually spaced conditions, they are held together in contact while being fed on the bottle conveyor 153 so that the bottles will not fall down. However, the bottles are still conveyed unstably on the bottle conveyor 153. If the bottle conveyor 153 is operated in a pulsating manner or foreign matter is jammed in the bottle conveyor 153, some of the bottles may fall over and not be conveyed any longer. When this happens, the bottle conveyor 153 itself and other machines coupled thereto must be shut off, resulting in a reduced production rate.

The uncaser 152 for removing bottles from a box and the bottle conveyor 153 for individually delivering the bottles to the bottle supply apparatus 155 require a large expenditure of installation and energy costs, and also take up a Wide installation floor space.

SUMMARY OF THE INVENTION

In view of the foregoing drawbacks of the conventional arrangement, it is an object of the present invention to provide a container supply system for supplying containers such as bottles encased in a box directly to bottle carriers in a container processing machine by reversing the box upside down, so that various devices such as an uncaser, a container conveyor, etc.,are not required in combination with the container supply system.

In order to achieve the foregoing and other objects, according to the present invention, there is provided a container supply system for supplying a plurality of containers encased in a box to a container processing machine; the container supply system comprising: a box reverser for reversing the box with the containers encased therein so that an upper opening of the box is positioned downwardly of a bottom of the box; a container holder disposed in covering relation to the upper opening of the box for holding the containers to be discharged from the reversed box and thereafter releasing the containers; a container receiver having a plurality of container receiver members for receiving the containers, respectively, the container receiver being angularly movable between a container receiving position in which the container receiver members are inclined substantially parallel to the axes of the containers held by the container holder, and a container discharging position below the container receiving position; and a container ejector disposed adjacent to the container receiver and having a plurality of container ejector members for engaging respective bottoms of the containers received by the container receiver members in the container discharging position and for pushing the containers from the container receiver to the container processing machine.

When the box is reversed by the box reverser until the open end of the box is positioned downwardly of the bottom thereof, the containers such as bottles fall down and are held by the container holder against further falling down. The container receiver members of the container receiver are then brought into the container receiving position in which the container receiver members are inclined parallel to the axes of the containers held in the container holder. Then, the container are released from the container holder and received by the container receiver, after which the container receiver is angularly moved into the container discharging position. In the container discharging position, the containers are pushed by the container ejector members from the container receiver into carriers in the container processing machine such as a bottle washing machine.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

FIGS. 1 through 11 illustrate a container supply system according to an embodiment of the present invention. Bottles will hereinafter be described, by way of example, as containers which are supplied by the container supply system.

Figure 1:
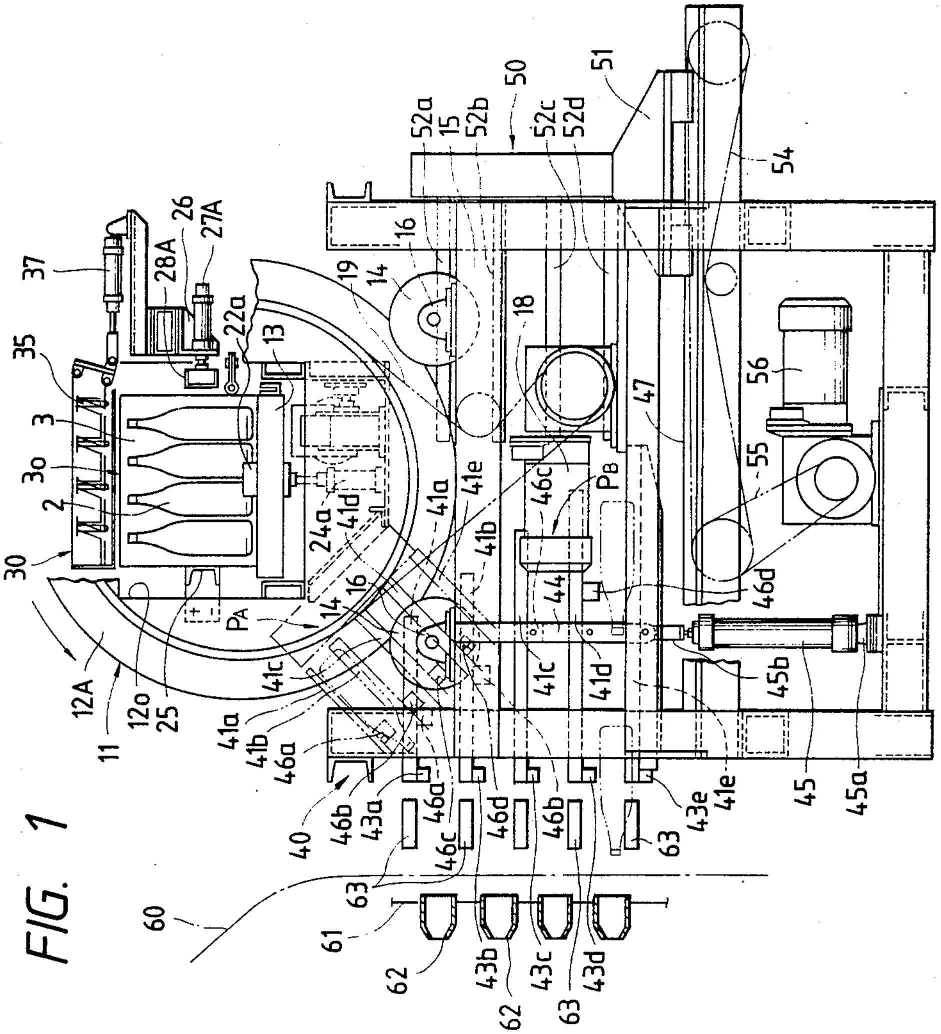
FIG. 1 is a front elevational view of a container supply system according to the present invention.
Figure 2:
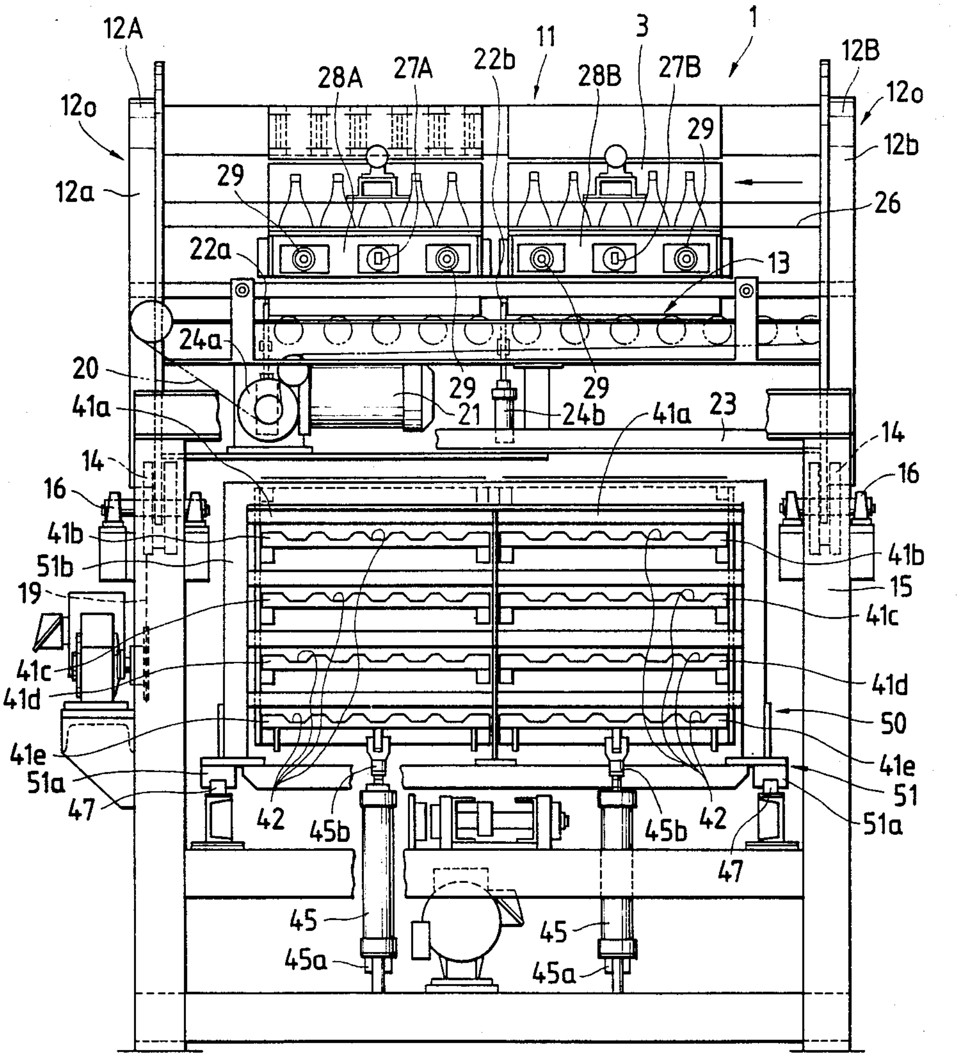
FIG. 2 is a side elevational view of the container supply system.

As shown in FIGS. 1 and 2, a container supply system 1 generally comprises a box reverser 11 for reversing, or turning upside down, boxes 3 encasing bottles 2, a container holder 30 disposed to cover an upper opening 3*o* of the box 3 for holding the bottles 2 in the reversed boxes 3 to prevent the bottles 2 from falling down, and a container receiver 40 for receiving the bottles 2 discharged from the reversed boxes 3.

The box reverser has a pair of front and rear circular rotary frames 12A, 12B, and a drive roller conveyor 13 disposed between the rotary frames 12A, 12B. The rotary frames 12A, 12B have substantially rectangular opening 120 defined respectively therein for the passage of boxes 3 therethrough into and out of the box reverser 11. The rotary frames 12A, 12B have peripheral portions 12*a*, 12*b*, respectively, each supported on a pair of laterally spaced support rollers 14. Therefore, the box reverser 11 is rotatably supported on the four support rollers 14. The support rollers 14 are rotatably supported by respective bearings 16 mounted on a support frame 15.

A chain 19 is trained around the front frame 12A and has opposite ends fastened to hooks (not shown) mounted on the rotary frame 12A at an upper righthand position (in the condition of FIG. 1) thereon. The chain 19 is connected to a reverser motor 18 fixedly mounted on the support frame 15, the reverser motor 18 having a speed reducer. When the reverser motor 18 is energized, the box reverser 11 is angularly moved through a certain angle (e.g., counterclockwise through about 135° in FIG. 1).

The drive roller conveyor 13 is operatively coupled through a chain 20 (FIG. 2) to a conveyor motor 21 with a speed reducer for conveying boxes 3 thereon in the direction indicated by the arrow in FIG. 2. A pair of front and rear stoppers 22*a*, 22*b* is vertically disposed at a terminal end and a substantially central portion, respectively, of the drive roller conveyor 13. The stoppers 22*a*, 22*b* are connected to respective stopper air cylinders 24*a*, 24*b* vertically mounted on a support plate 23 fixed to the support frame 15, so that the stoppers 22*a*, 22*b* can be moved upwardly beyond and downwardly below the upper surface of the drive roller conveyor 13 upon operation of the stopper air cylinders 24*a*, 24*b*. When the stoppers 22*a*, 22*b* are projected upwardly, they engage the respective boxes 3 on the drive roller conveyor 13 to stop the boxes 3.

Between the rotary frames 12A, 12B, there extends a pair of beam-like fixed and support brackets 25, 26 confronting each other, the support bracket 26 supporting a pair of gripping air cylinders 27A, 27B which are fixed thereto at spaced interval longitudinally along the support bracket 26. The air cylinders 27A, 27B have respective piston rods joined respectively to movable brackets 28A, 28B. When the air cylinders 27A, 27B are operated, the movable brackets 28A, 28B are moved toward the fixed bracket 25 while being guided by respective guide rods 29, for gripping the boxes 3 on the drive roller conveyor 13. The brackets 25, 28A, 28B thus jointly serve as a box gripper. While the boxes 3 are gripped by the box gripper, the box reverser 11 is angularly moved counterclockwise (FIG. 1) through about 135° until the upper openings 3*o* of the gripped boxes 3 are positioned below their bottoms.

Figure 3:
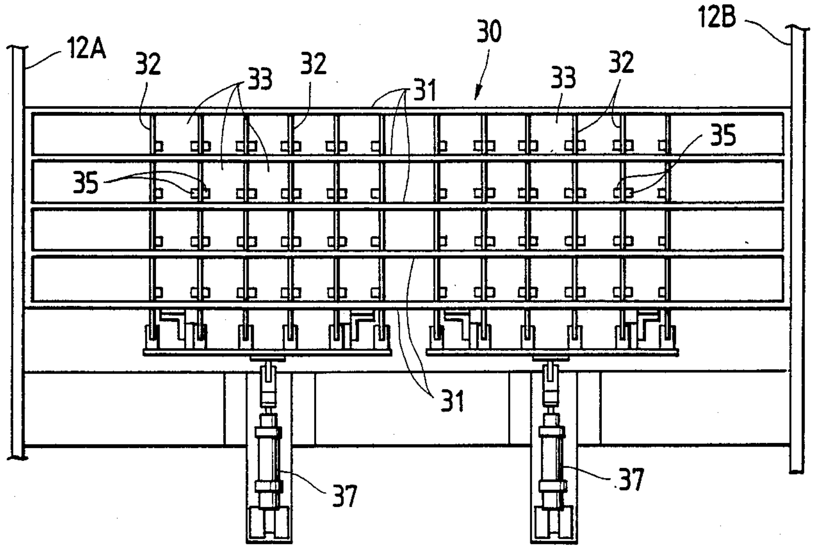
FIG. 3 is a plan view of a container holder in the container supply system.
Figure 4:
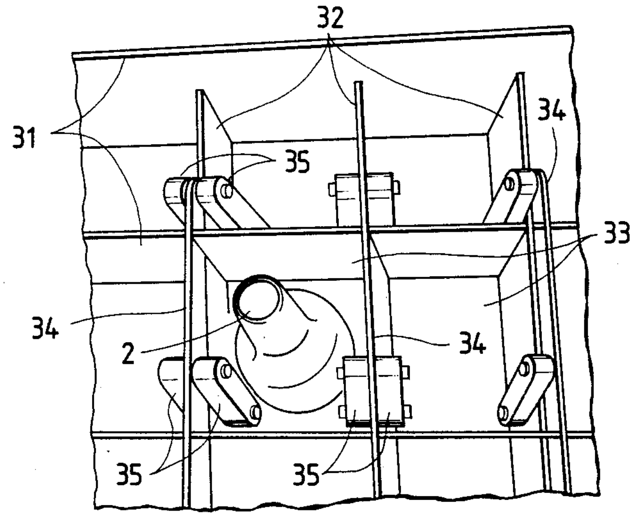
FIG. 4 is an enlarged fragmentary perspective view of the container holder.

The container holder 3*o* for holding the bottles 2 within the reversed boxes 3 is disposed in an upper portion of the box reverser 11 for covering the upper openings 3*o* of the boxes 3 as they are supplied to the box reverser 11. As shown in FIG. 3, the container holder 30 has a plurality of side plates 31 extending between the rotary frames 12A, 12B in parallel spaced relationship, and a plurality of partition plates 32 extending perpendicularly across the side plates 31 in parallel spaced relationship. The side and partition plates 31, 32 jointly define a number of bins 33 for storing bottles 2 respectively therein. As shown in FIG. 4, slide plates 34 are disposed respectively below the partition plates 32 and lie in the same plane as the partition plate 32, the slide plates 34 being parallel and adjacent to the partition plate 32. Pairs of engaging bars 35 are pivotally coupled to opposite sides of the slide plates 34 and opposite sides of the partition plates 32 for engaging sides of the bottles 2 disposed in the respective bins. The slide plates 34 are divided into two groups in which they are operatively connected to two air cylinders 37 (FIGS. 1 and 3). When the air cylinders 37 are actuated, the slide plates 34 are moved back and forth to angularly displace the engaging bars 35 between an inclined position in which they engage the bottles 2 and an erected position in which they release the bottles 2. When the engaging bars 35 are inclined, they hold the bottles 2 which have fallen from the boxes 3. When the engaging bars 35 are erected, they release the bottles 2 to allow them to be discharged from the boxes 3.

As illustrated in FIGS. 1 and 2, the container receiver 40 comprises two sets of vertically spaced container receiver members 41*a* through 41*e*, links interconnecting the container receiver members 41*a* through 41*e*, and a pair of receiver air cylinders 45 for vertically moving the links 44. As shown in FIG. 2, each of the container receiver members 41*a* through 41*e* has an array of bottle receiving recesses 42 defined in its upper surface. The container receiver members 41a through 41e have ends (lefthand ends in FIG. swingably supported by pivot shafts 43a through 43e.

The air cylinders 35 have base ends 45a swingably supported on the bottom of the support frame 15 and piston rods 45b pivotally connected to the links 44. When the air cylinders 45 are operated to extend the piston rods 45b, the air cylinders 45 swing about the base ends 45a and cause the links 44 to be vertically translated for tilting the container receiver members 41a through 41e through a certain angle (about 45° in the illustrated embodiment) from a horizontal position into an inclined position as indicated by the two-dot-and-dash lines in FIG. 1. More specifically, the container receiver members 41a through 41e are angularly movable between a container receiving position $P_A$ (i.e., the inclined position) in which they are substantially parallel to the axes of the bottles 2 tilted by the reversed boxes 3, and a container discharging position $P_B$ (i.e., the horizontal position) which is disposed below the container receiving position $P_A$. The container receiver members 41a through 41e receive the bottles 2 falling from the boxes 3 in the container receiving position $P_A$, and then displace the received bottles 2 into the container discharging position $P_B$.

The container receiver members 41a through 41d have retainers 46a through 46d depending respectively from their central lower surfaces. When the container receiver members 41a through 41e are in the container receiving position $P_A$, or the inclined position, the retainers 46a through 46d engage the shoulders of the bottles 2 falling from the boxes to retain the bottles 2 on the container receiver members 41b through 41e. When the container receiver members 41a through 41e are in the container discharging position $P_B$, or the horizontal position, the adjacent container receiver members 41a through 41e are spread from each other to lift the retainers 46a through 46d from engagement with the bottles 2, which are now released.

A pair of parallel spaced guide rails 47 is supported on the support frame 15 immediately below the container receiver 40. A container ejector 50 is disposed on the guide rails 47 for ejecting the bottles 2 in the container discharging position $P_B$ out of the container receiver 40. The container ejector 50 comprises a movable support 51 mounted on and movable along the guide rails 41, and a plurality of ejector members 52a through 52d projecting horizontally from the movable support 51 toward the container receiver 40. The movable support 51 comprises a pair of runners 51a movable on the guide rails 47, and a support member 51b interconnecting the runners 51a and supporting the ejector members 52a through 52d. The movable support 51 is operatively coupled to an ejector motor 56 through chains 54, 55 for reciprocally moving on the guide rails 47. The ejector members 52a through 52d are positioned so that they push the corresponding bottoms of the bottles 2 in the container discharging position $P_B$ when the movable support 51 is moved toward the container receiver 40.

As shown in FIG. 1, a bottle washing machine 60 has a movable endless chain 61 to which a number of bottle carriers 62 are fixed. Fixed guides 63 are disposed between the container receiver 40 and the carriers 62 for guiding the bottles 2 when they are ejected from the container receiver 40 into the respective carriers 62.

A process of supplying bottles from the container supply system thus constructed to the bottle washing machine 60 will now be described with reference to FIGS. 5 through 11.

Figure 5:
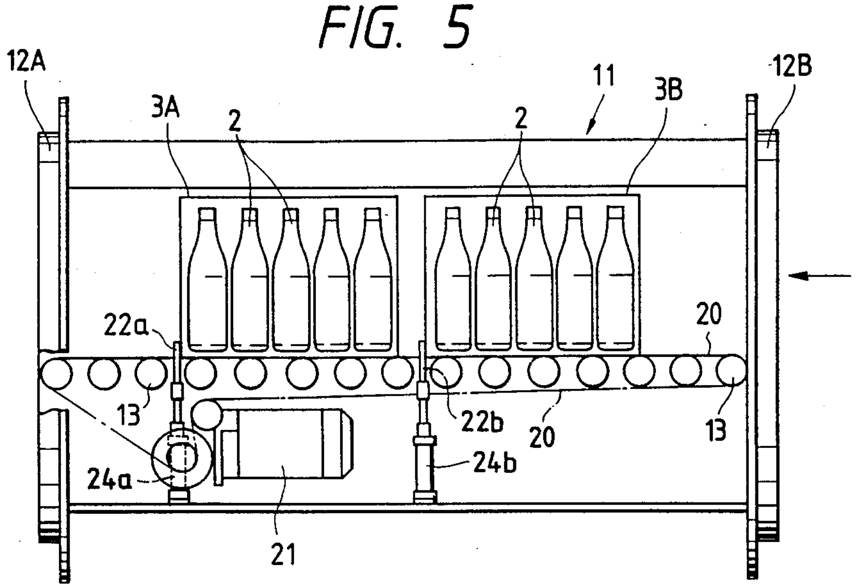
FIGS. 5 through 11 are views illustrative of an operation sequence of the container supply system.

As shown in FIG. 5, boxes 3A, 3B each encasing a number of bottles 2 are supplied by a conveyor or the like in the direction indicated by the arrow onto the drive roller conveyor 13 of the box reverser 11. Then, the boxes 3A, 3B are delivered in the same direction by the drive roller conveyor 13 which is driven by the motor 21. At this time, the air cylinder 24a has been actuated to project the box stopper 22a above the upper surface of the drive roller conveyor 13. Therefore, the box 3A fed by the drive roller conveyor 13 is engaged by the stopper 22a and stopped. Thereafter, the stopper 22b is projected upwardly by the air cylinder 24b to engage and stop the box 3B which is subsequently supplied to and delivered by the drive roller conveyor 13. Then, the motor 21 is de-energized to stop the drive roller conveyor 13.

Figure 6:
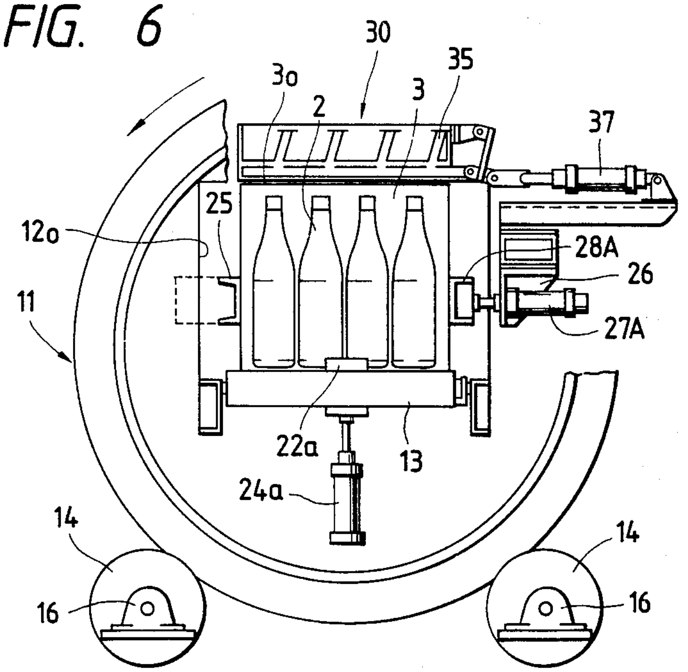

Then, as shown in FIG. 6, the air cylinders 27A, 27B are operated to cause the movable brackets 28A, 28B to grip the boxes 3A, 3B in coaction with the fixed bracket 25. At this time, the air cylinders 37 of the container holder 30 have been operated to advance the slide plates 34 to tilt the engaging bars 35 so as to be capable of holding the bottles 2 (see FIG. 4).

Figure 7:
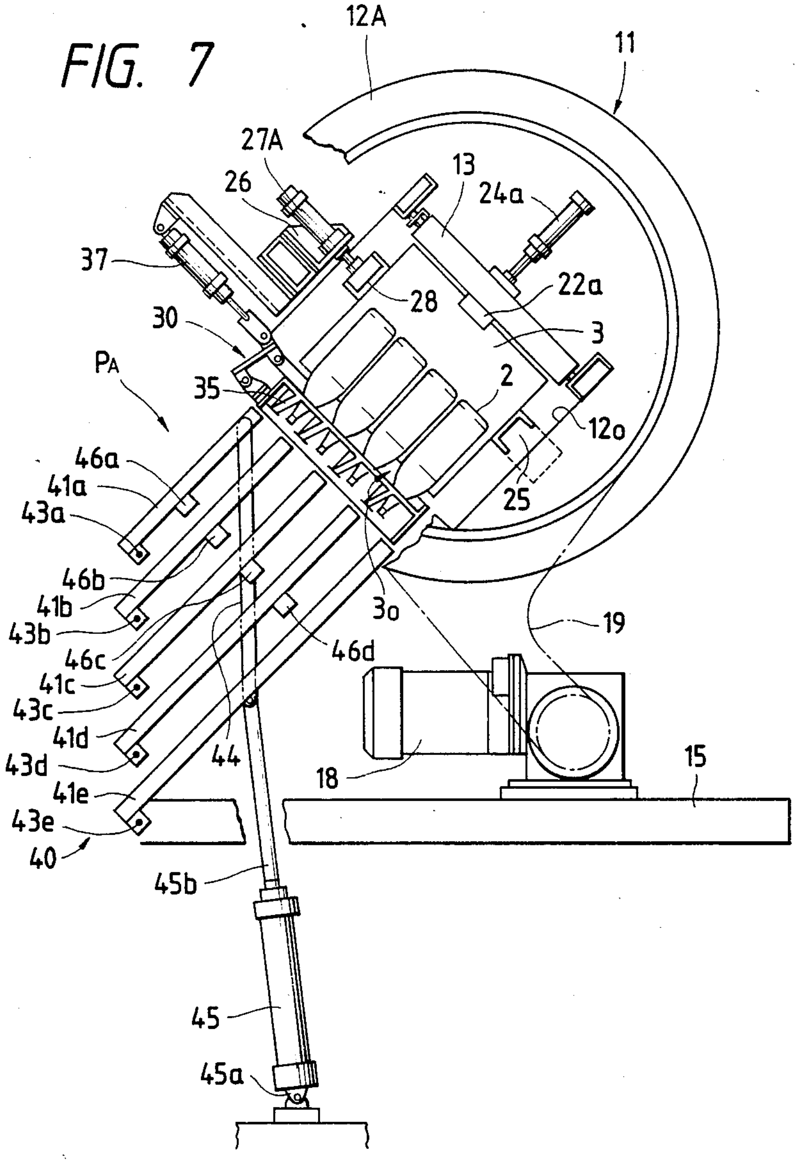

The reverser motor 18 is now energized to rotate the box reverser 11 through about 135° as shown in FIG. 7 until the upper openings 3o of the boxes 3 are positioned below the bottoms thereof With the boxes being thus turned upside down, the bottles 2 fall down from the boxes 3, but are engaged and retained by the tilted engaging bars 35 of the container holder 30 that is positioned in covering relation to the upper openings 3o of the boxes 3.

As illustrated in FIG. 7, the air cylinders 45 of the container receiver 40 are operated to extend the piston rods 45b thereof to move the links 44 for thereby swinging the container receiver members 41a through 41e about the pivot shafts 43a through 43e from the horizontal container discharging position $P_B$ through about 45° to the inclined container receiving position $P_A$.

Figure 8:
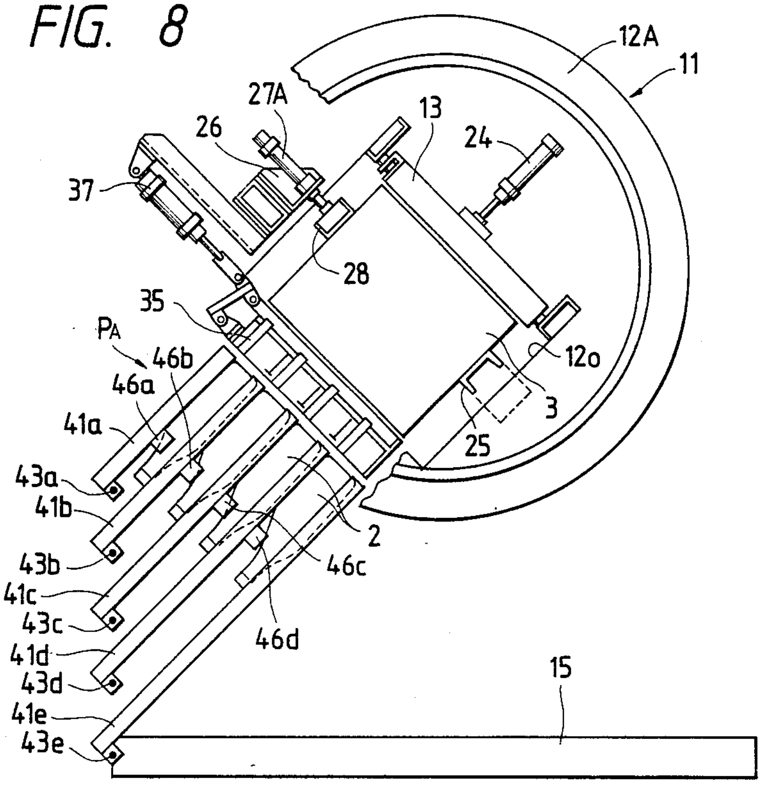

The air cylinders 37 of the container holder 30 are not inactivated to erect the engaging bars 35 to release the bottles 2 from the engaging bars 35 as shown in FIG. 8. The bottles 2 then fall down from the bins of the container holder 30 into bottle passages defined by the container receiver members 41a through 41e which are positioned in the container receiving position $P_A$. The retainers 46a through 46d on the container receiver members 41a through 41d engage the shoulders of the incoming bottles 2, and the container receiver members 41a through 41e themselves contact sides of the bottles 2, whereupon the bottles 2 are retained in the container receiver 40.

The air cylinders 45 are then inactivated to retract the piston rods 45b to move the container receiver members 41a through 41e from the container receiving position $P_A$ downwardly to the horizontal container discharging position $P_B$. In the container discharging position $P_B$, the distances between the adjacent container receiver members 41a through 41e are greater than those in the container receiving position $P_A$, so that the bottles 2 are disengaged from the retainers 46a through 46d.

Figure 9:
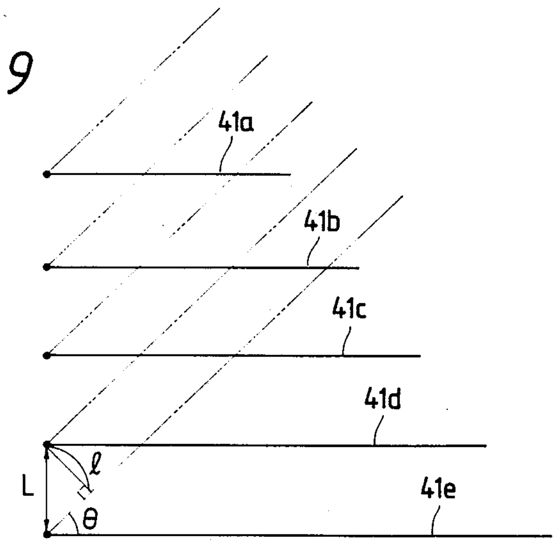

More specifically, as shown in FIG. 9, if it is assumed that the distances between the adjacent container receiver members 41a through 41e are represented by L when they are in the horizontal position and by l when they are inclined at $\theta$, then these distances L and l are of the following relationship:

$$l = L \sin(90^\circ - \theta) = L \cos\theta$$

Since $\theta = 45^\circ$ in this embodiment, we get $l = L/\sqrt{2} = 0.7L$, end hence the bottles 2 are reliably released from the retainers 46a through 46d.

Figure 10:
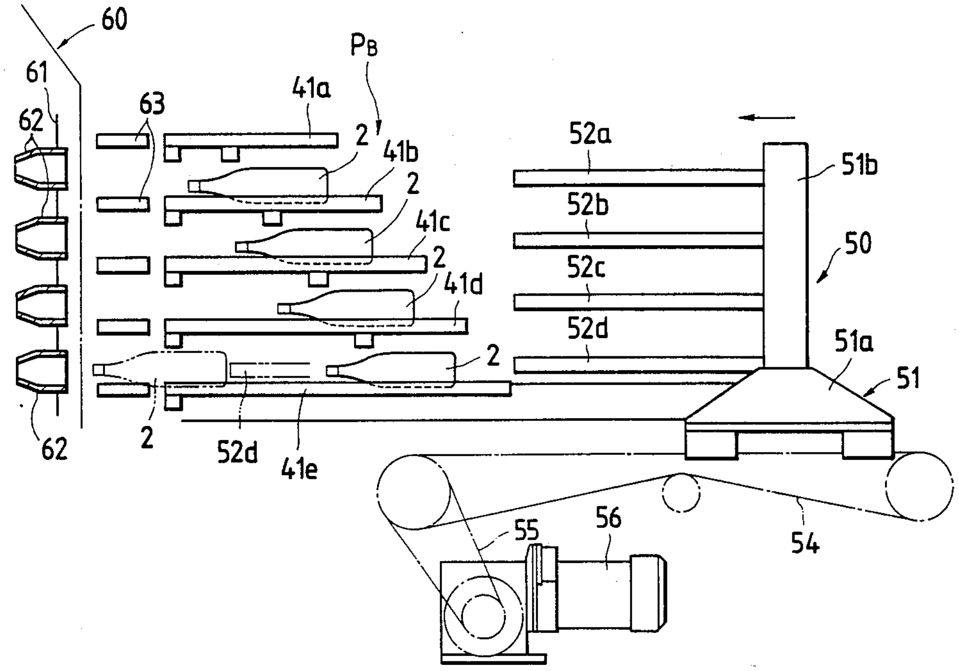
Figure 11:
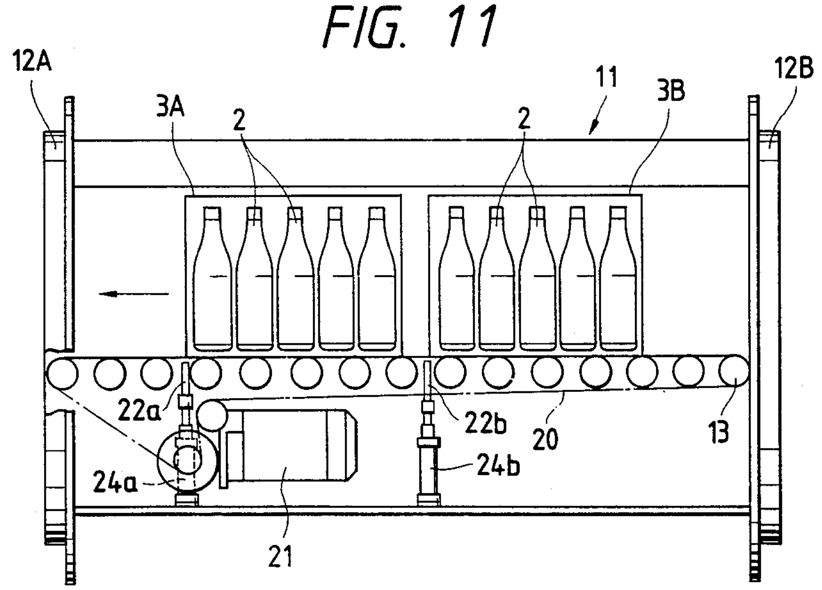

Then, as illustrated in FIG. 10, the ejector motor 56 is energized to move the ejector members 52a through 52d toward the bottle receiver 40 to push the bottoms of the bottles 2, until the bottles 2 are displaced into the carriers 62 of the bottle washing machine 60. Now, the process of supplying the bottles 2 into the bottle washing machine 60 is completed. Thereafter, the box reverser 11 is rotated back to the original position, and the empty boxes 3A, 3B are released from the movable brackets 28A, 28B and the fixed bracket 25. The stoppers 22a, 22b are retracted downwardly as shown in FIG. 11, and the drive roller conveyor 13 discharges the empty boxes 3A, 3B in direction indicated by the arrow. The box reverser 11 is then readied for receiving next boxes encasing bottles.

A modified container supply system will be described below with reference to FIGS. 12 through 19. According to the modification, a box reverser and a container receiver are structurally spaced from each other but functionally connected to each other by a delivery carriage.

Figure 12:
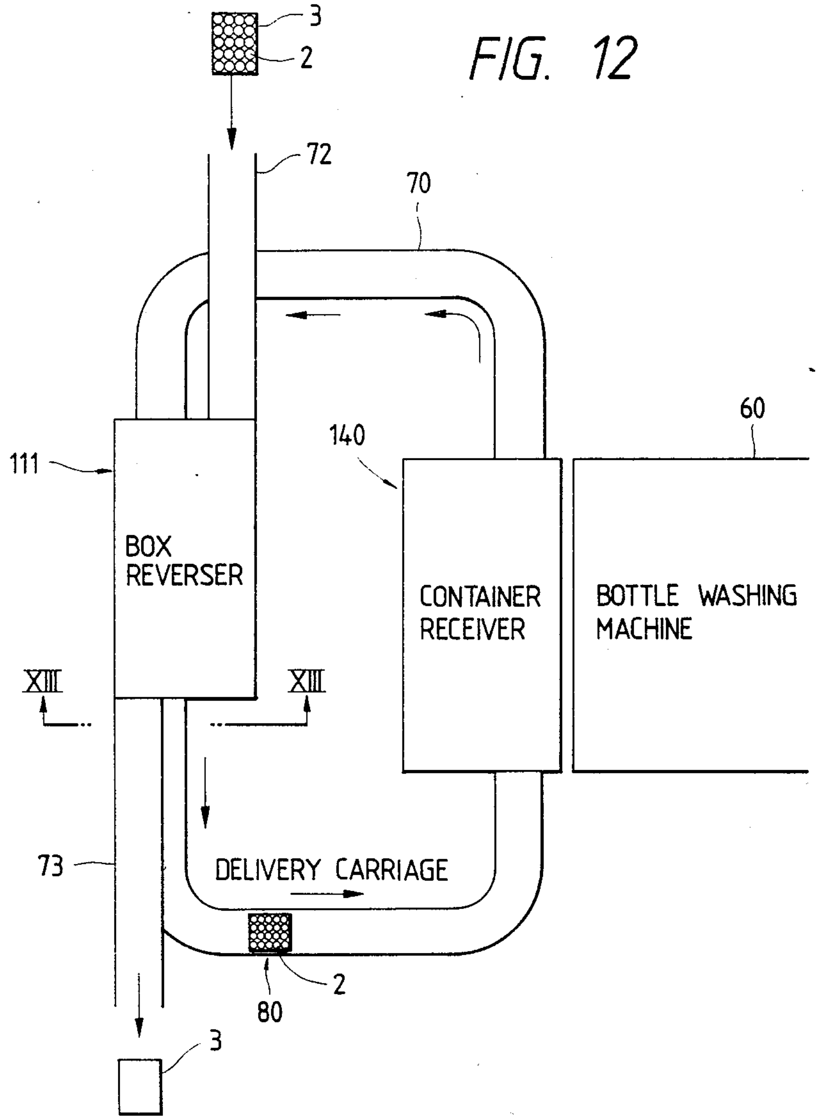
FIGS. 12 is a plan view of a modified container supply system according to the present invention.

As shown in FIG. 12, a box reverser 111 and a container receiver 140 are positioned in spaced, substantially confronting relationship to each other. The box reverser 111 and the container receiver 140 are functionally interconnected by a looped conveyor path 70. A box 3 encasing bottles 2 is supplied to the box reverser 111 by means of a conveyor 72, and an empty box 3 is discharged from the box reverser 111 by another conveyor 73.

Figure 13:
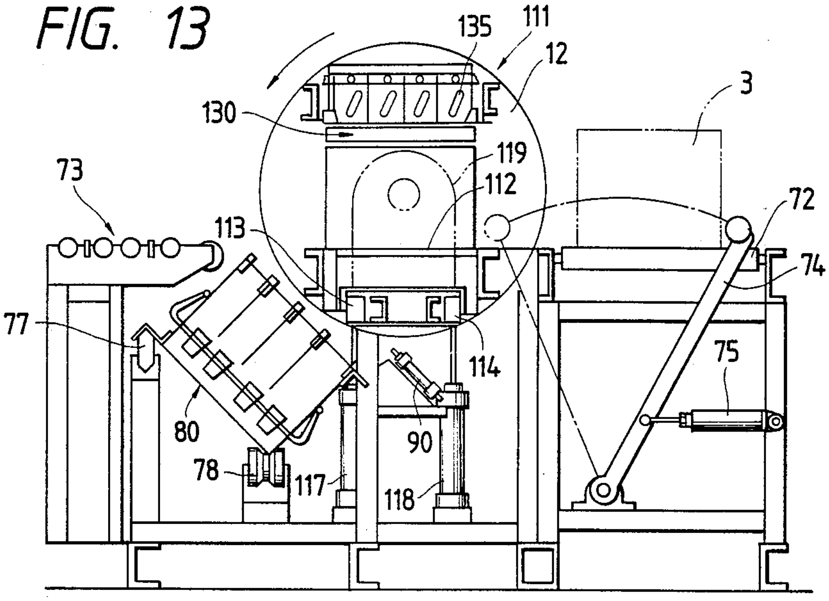
FIG. 13 is an elevational view taken along line XIII—XIII of FIG. 12.

The box reverser 111 includes rotary frames and other mechanisms which are substantially the same as those of the box reverser 11 of the foregoing embodiment. However, as shown in FIG. 13, a box reverser mechanism for rotating the rotary frames comprises two reverser air cylinders 117, 118 and a chain 119. A box 3 encasing bottles 2 is supplied to the box reverser 111 by a swing bar 4 and a box supply air cylinder 75.

The box reverser 111 has a box table 112 which is vertically movable by box base air cylinders 113, 114. A box holder 130 is disposed in an upper portion of the box reverser 111. The box holder 130 is substantially identical in construction to the box holder 30 of the previous embodiment, but differs therefrom in that the container holder 130 and the box table 112 double as a box gripper. More specifically, the box table 112 with a box 3 placed thereon is elevated to grip the box 3 vertically between the box table 112 and the box holder 130, after which the box reverser 111 is rotated about 135° to reverse or turn the box 3 upside down.

The bottles 2 in the reversed box 3 is held in position by engaging bars 135 in the box holder 130. When released from the engaging bars 135, the bottles 2 fall down and are stored in the delivery carriage 80, which is then moved to carry the bottles 2 to the container receiver 140.

Figure 14:
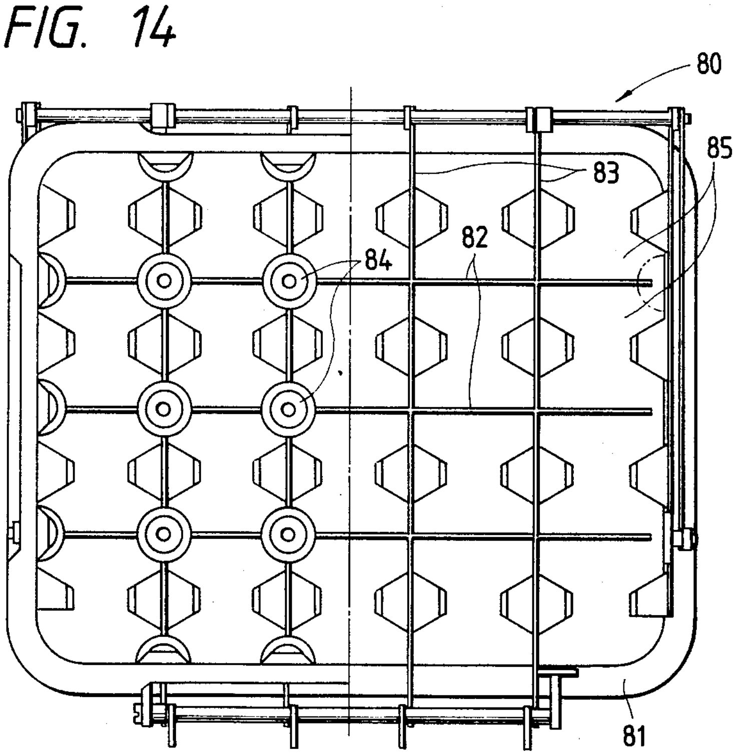
FIG. 14 is a plan view of a delivery carriage in the container supply system shown in FIG. 12.
Figure 15:
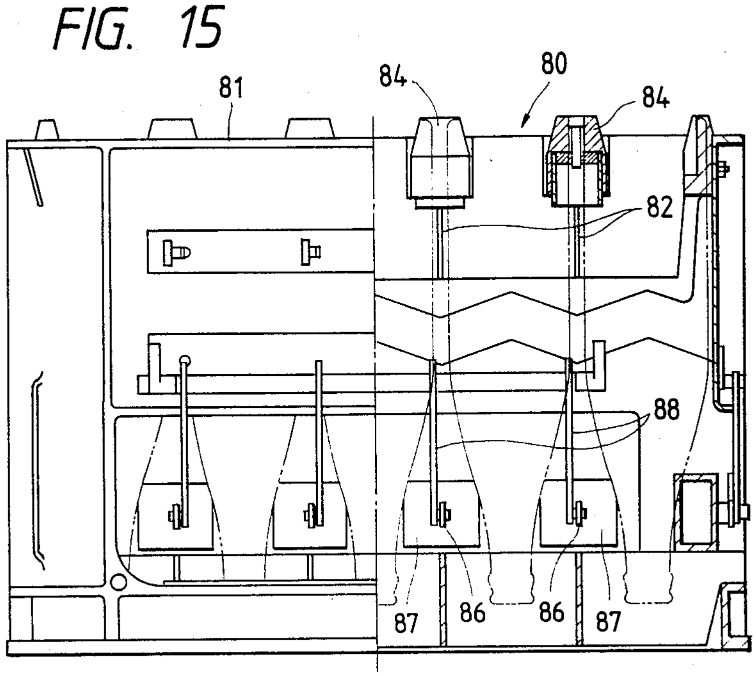
FIG. 15 is a front elevational view, partly cut away, of the delivery carriage.
Figure 16:
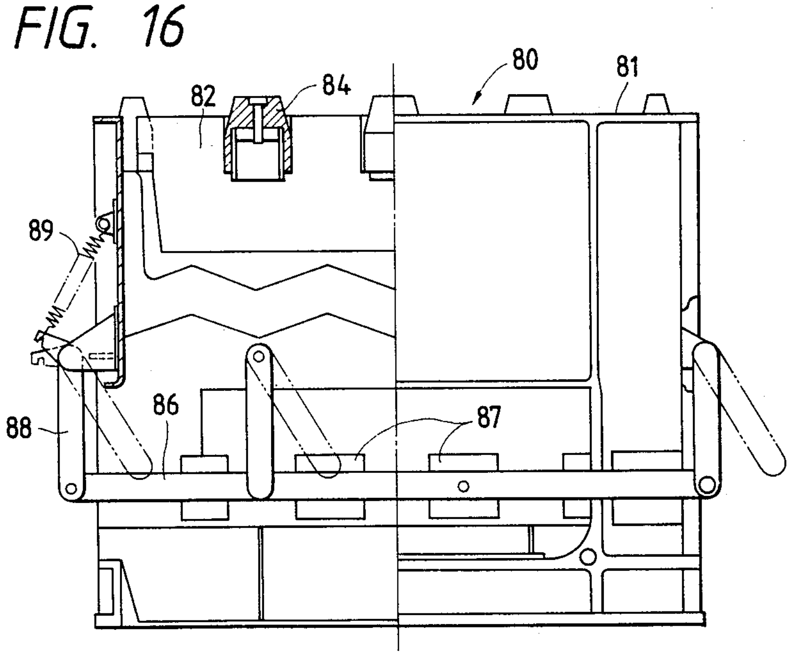
FIG. 16 is a side elevational view, partly cut away, of the delivery carriage.

As illustrated in FIGS. 14 through 16, the delivery carriage 80 comprises an outer frame 81, a plurality of partition plates 82, 83 mounted in an upper portion of the outer frame 81 and perpendicularly crossing each other, and fixed guides 84 disposed in the respective intersections of the partition plates 82, 83. The partition plates 82, 83 jointly define bins for storing the bottles respectively therein. Slide plates 86 are disposed in a lower portion of the outer frame 81 and positioned below the respective partition plates 82 in the same planes as these partition plates 82, the slide plates 86 being parallel and adjacent to the partition plates 82. Engaging members 87 are mounted on the respective slide plates 86 for engaging sides of the bottles. The slide plates 86 are swingably supported on swing levers 88 pivotally mounted on the outer frame 81. As shown in FIG. 16, the leftmost one (FIG. 16) of the swing levers 88 is normally biased by a tension spring 89 to cause the engaging members 87 to engaging and hold the sides of the bottles 2. By pushing the leftmost swing lever 88 against the bias of the tension spring 89 to move the slide plates 86, the engaging members 87 are shifted into vertical alignment with the corresponding fixed guides 84, thus releasing the engaging members 87 from the bottles 2 which are then allowed to drop from the delivery carriage 80.

As shown in FIG. 13, the looped conveyor path 70 interconnecting the box reverser 111 and the container receiver 150 has rollers 77, 78 for supporting the delivery carriage 80 and allowing it to run along the looped conveyor path 70. The container receiver 140 for receiving bottles falling from the delivery carriage 80 is of the same construction as the container receiver 40 of the preceding embodiment.

Figure 17:
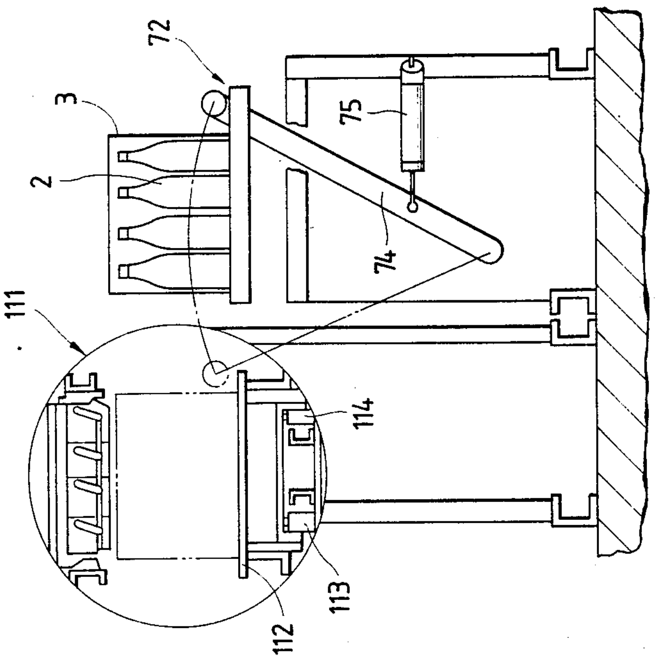

The modified container supply system shown in FIGS. 12 through 19 operates to supply bottles to a bottle washing machine as follows:

As shown in FIG. 12, a box 3 in which a number of bottles 2 are encased is delivered by the conveyor 72 to a position near the box reverser 111. Then, a box supply air cylinder 75 is operated to turn the swing lever 74 to push the box 3 from the conveyor 72 onto the box table 112 as shown in FIG. 17.

Figure 18:
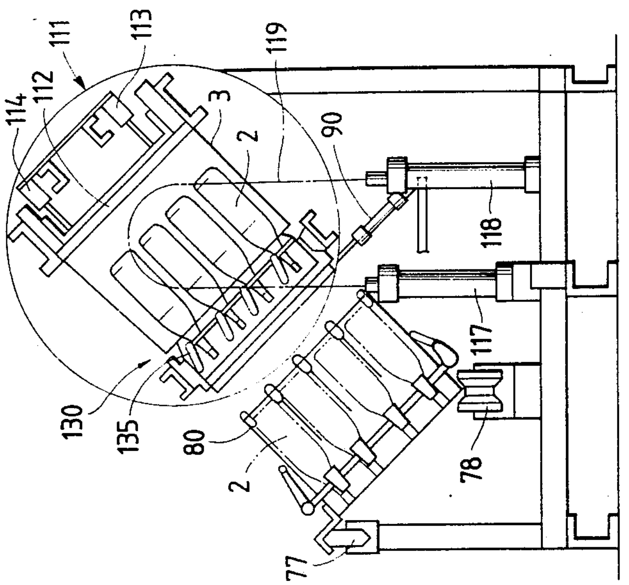
FIGS. 17 through 19 are views illustrating an operation sequence of the container supply system of FIG. 12.

Thereafter, the box table air cylinders 113, 114 are operated to lift the box table 112 until the box 3 is gripped vertically between the box table 112 and the container holder 130 as shown in FIG. 18. The reverser air cylinder 117 is retracted to move the chain 119 to turn the box reverser 111 counterclockwise through about 135°, thereby reversing the box 3. The bottles 2 in the box 3 fall down, but are retained by the engaging bars 135 in the container holder 130.

Figure 19:
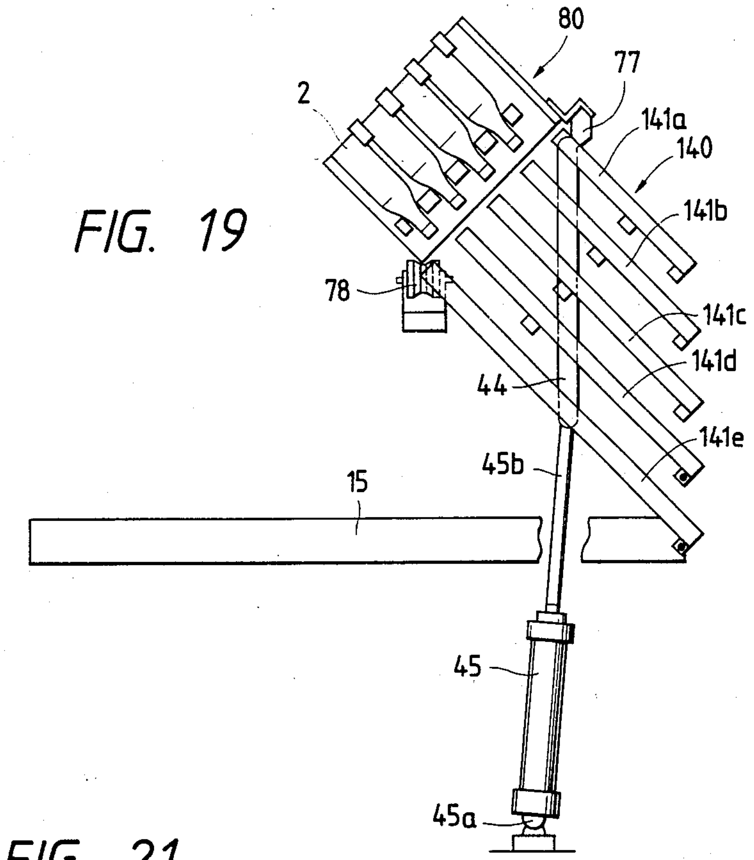
Figure 21:
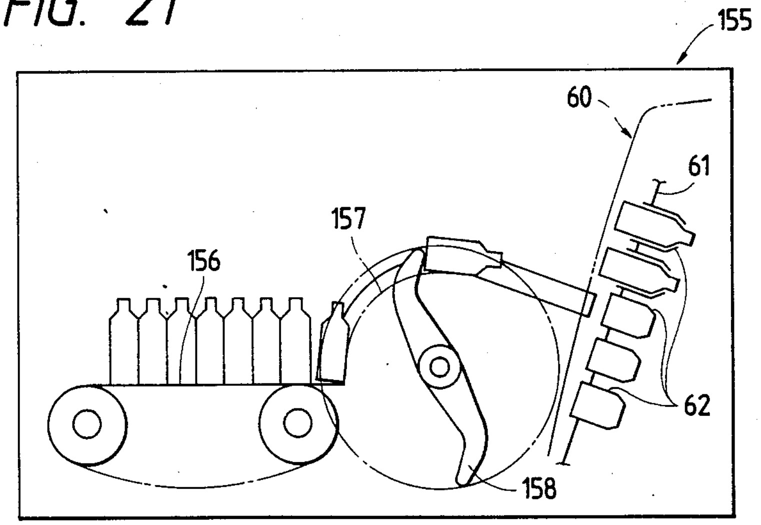
FIG. 21 is a cross-sectional view of a bottle supply apparatus in the conventional bottle supply system shown in FIG. 20.
Figure 20:
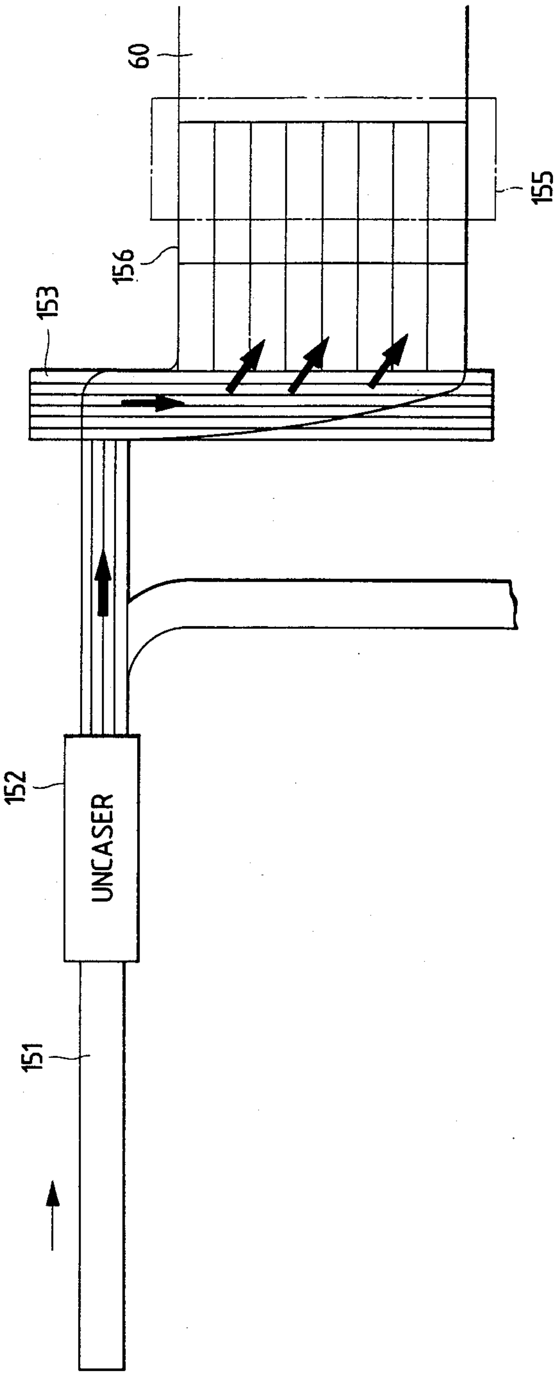
FIG. 20 is a schematic plan view of a conventional bottle supply system.

At this time, the delivery carriage 80 is positioned obliquely downwardly of the reversed box 3 as shown in FIG. 18. An air cylinder 90 disposed directly below the box reverser 111 is now operated to cause the engaging bars 135 to disengage from the bottles 2, which then fall from the box reverser 111 and are received in the delivery carriage 80. As illustrated in FIG. 19, the delivery carriage 80 travels to carry the bottles 2 to a position obliquely upwardly of container receiver members 141a through 141e of the container receiver 140.

The swing levers 88 of the delivery carriage 80 are pushed to release the engaging members 87 from the bottles 2 in the delivery carriage 80, whereupon the bottles 2 are placed into the container receiver 140. Subsequent operation is the same as that in the container supply system shown in FIGS. 1 through 11, and will not be described in detail.

With the present invention, as described above, containers such as bottles can be supplied directly from a box to carriers in a container processing machine such as a bottle washing machine by reversing the box with the containers encased therein. Since the containers are not required to be delivered individually to the container processing machine, the containers are prevented from falling over a route to the container processing machine, and hence undesirable shutdown of the conveyor and associated devices, which would otherwise be caused by falling over of bottles, is prevented from occurring.

Moreover, since the containers are not taken out of the box and not individually delivered to the container processing machine, various devices such as an uncaser, a bottle conveyor, etc. are not required. Accordingly, the container supply system is less costly and takes up a relatively small installation space.

Although certain preferred embodiments have been shown and described, it should be understood that many changes and modifications may be made therein without departing from the scope of the appended claims.

What is claimed is:

1. A container supply system for supplying a plurality of containers encased in a box to a container processing machine, the container supply system comprising:

a box reverser for reversing the box with the containers encased therein so that an upper opening of the box is positioned downwardly of a bottom of the box;

a container holder disposed in covering relation to the upper opening of the box for holding the containers to be discharged from the reversed box and thereafter releasing the containers:

a container receiver having a plurality of container receiver members for receiving the containers, respectively, said container receiver being angularly movable between a container receiving position in which the container receiver members are inclined substantially parallel to the axes of the containers held by said container holder, and a container discharging position below said container receiving position; and a container ejector disposed adjacent to said container receiver and having a plurality of container ejector members for engaging respective bottoms of the containers received by said container receiver members in said container discharging position and for pushing the containers from said container receiver to the container processing machine.

2. A container supply system according to claim 1, wherein said box reverser comprises a box gripper for gripping end holding said reversed box.

3. A container supply system according to claim 1, wherein said container receiver is positioned below said box reverser.

4. A container supply system according to claim 1, wherein said box reverser and said container receiver are integrally provided with each other.

5. A container supply system according to claim 1, wherein said box reverser and said container receiver are spacedly provided from each other further comprising a delivery carriage for receiving the containers from said box reverser and delivering the received containers to said container receiver.

6. A container supply system according to claim 1, wherein said container receiver members have retainers which engage the shoulders of said containers falling from said boxes to retain said containers in said container receiving position.

7. A container supply system according to claim 6, wherein the distances between the adjacent container receiver members in said container discharging position are greater than those in said container receiving position to allow said containers to be disengaged from said retainers.

* * * * *